(12) United States Patent
Lane et al.

(10) Patent No.: US 7,529,774 B2
(45) Date of Patent: May 5, 2009

(54) SYSTEM AND METHOD FOR EFFICIENTLY CREATING, MANAGING, AND DEPLOYING A DEVICE DATABASE

(75) Inventors: Carlton Lane, Seattle, WA (US); Scott Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/719,481

(22) Filed: Nov. 21, 2003

(65) Prior Publication Data
US 2005/0114376 A1 May 26, 2005

(51) Int. Cl.
*G06F 17/30* (2006.01)

(52) U.S. Cl. .................. 707/200; 709/223; 717/173; 717/130

(58) Field of Classification Search .......... 702/193; 707/200, 1; 709/223; 717/173, 130
See application file for complete search history.

(56) References Cited

U.S. PATENT DOCUMENTS

| | | | | |
|---|---|---|---|---|
| 5,953,525 | A  * | 9/1999 | Glaser et al. | 717/105 |
| 6,415,246 | B1 * | 7/2002 | Snyder | 702/193 |
| 6,732,089 | B1   | 5/2004 | Sinn | |
| 6,735,766 | B1 * | 5/2004 | Chamberlain et al. | 717/173 |
| 6,760,903 | B1 * | 7/2004 | Morshed et al. | 717/130 |
| 6,957,366 | B1 * | 10/2005 | McDonald | 714/38 |
| 6,973,647 | B2 * | 12/2005 | Crudele et al. | 717/177 |
| 7,017,148 | B2 * | 3/2006 | Kumar | |
| 7,181,739 | B1 * | 2/2007 | Harral et al. | 717/176 |
| 2002/0038450 | A1 * | 3/2002 | Kloppmann et al. | 717/102 |
| 2002/0091712 | A1 * | 7/2002 | Martin et al. | 707/200 |
| 2002/0116698 | A1 * | 8/2002 | Lurie et al. | 717/100 |
| 2003/0055919 | A1 * | 3/2003 | Fong et al. | 709/220 |
| 2004/0019668 | A1 * | 1/2004 | Kakadia | 709/223 |
| 2004/0044693 | A1 * | 3/2004 | Hadley et al. | 707/200 |
| 2004/0243534 | A1 * | 12/2004 | Culter et al. | 707/1 |

OTHER PUBLICATIONS

Chays, D. et al., "A Framework for Testing Database Applications", *ACM*, 2000, 147-157.
Eisenberg, A., "New Standard for Stored Procedures in SQL", *SIGMOND Record*, Dec. 1996, 25(4), 81-88.
Hevner, A.R. et al., "Product and Project Challenges in Electronic Commerce Software Development", 14 pages.
Inverardi, P. et al., "Correct Deployment and Adaptation of Software Applications on Heterogenous (mobile) Devices", *WOSS*, 2002, 108-110.
Kaikkonen, A. et al., "Navigating in a Mobile XHTML Application", *CHI*, Apr. 2003, 5(1), 329-336.

* cited by examiner

*Primary Examiner*—Khanh B Pham
(74) *Attorney, Agent, or Firm*—Woodcock Washburn LLP

(57) ABSTRACT

A development tool enables a device database to be created, managed, and deployed to a device as part of the a device project. The device database may have an installation property which provides logic for installing the device database at the device. Additionally, stored procedures and triggers may be registered with the device database. The registered stored procedures and triggers may be embedded in the device database and deployed to the device along with the device database.

12 Claims, 15 Drawing Sheets

(Prior Art)

(Prior Art)

800

900

1300

1400

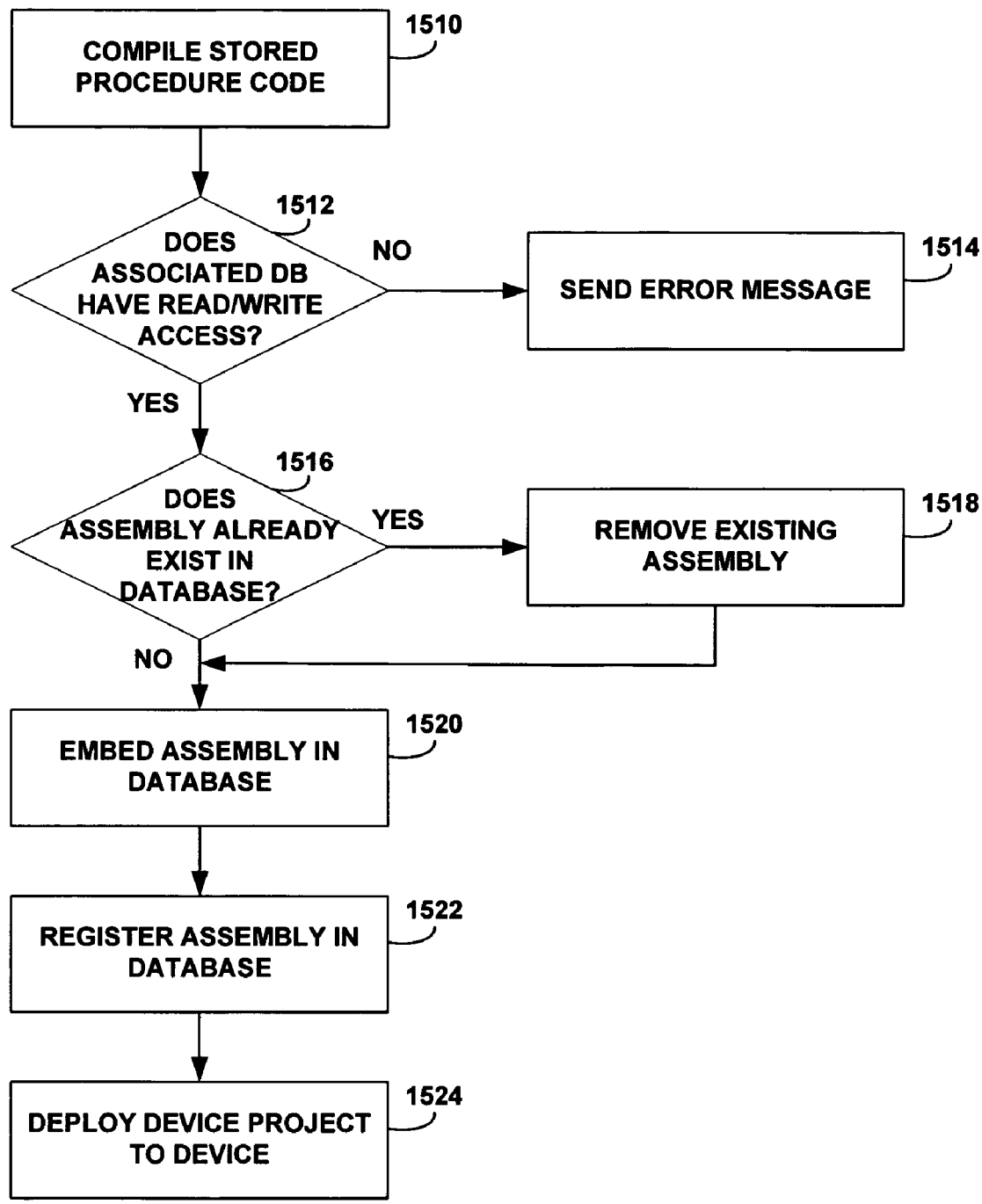

SYSTEM AND METHOD FOR EFFICIENTLY CREATING, MANAGING, AND DEPLOYING A DEVICE DATABASE

REFERENCE TO RELATED APPLICATION

This application is related by subject matter to U.S. patent application Ser. No. 10/718,951 entitled "System and Method for Registering and Deploying Stored Procedures and Triggers into a Device Database" filed on Nov. 21, 2003, the contents of which are hereby incorporated by reference in their entirety.

FIELD OF THE INVENTION

The present invention relates to the field of software development and, more specifically, to efficiently creating and managing a device database in a development environment and deploying the device database from the development environment to a device.

BACKGROUND OF THE INVENTION

A development tool such as, for example, VISUAL STUDIO™ from Microsoft Corp. of Redmond, Wash., enables development of a wide range of computing applications. Such applications may include, for example, web applications, extensible markup language (XML) applications, and traditional client applications. A development tool may assist developers in several phases of the development process. Such phases may include designing an application, debugging test versions of the application, and distributing a finished version of the application. The development process often includes several builds in which test versions of an application may be debugged before the finished version of the application is ready for distribution.

If an application is data-driven, then the application may have one or more associated databases. Such databases may be used to categorize, organize, and maintain data which are useful to an application. The development process for an associated database often parallels the development process for an application. The associated databases are typically debugged along with test versions of the application. Furthermore, finished versions of the associated databases may be distributed along with finished versions of the application.

Related to the development of applications and associated databases is the creation of stored procedures. A stored procedure is a collection of one or more statements that generally retrieves or modifies data in a database. A stored procedure is precompiled and stored at a database for later use. A database may contain a set of associated stored procedures which it treats as a unit. A stored procedure may define complex business rules, control data modification, limit access to data through security permissions, and/or provide transactional integrity. A stored procedure is typically written in a query language such as, for example, a structured query language (SQL) or a language supported by the database engine.

A trigger is a unique type of stored procedure that runs when data in a specified table is modified using one or more data modification operations. Such modification operations may be updates, deletions, or insertions. A trigger may query or edit table(s) and may include complex SQL statements. A trigger is primarily useful for maintaining relational integrity in the database or enforcing complex business rules and requirements. For example, a trigger may determine, based on a customer's current account status, whether to allow a new order to be inserted into a table.

A development tool may enable the development of data-driven applications for a wide range of computers. For example, a development tool may enable development of applications for a traditional computer such as a desktop or a laptop computer. A development tool may also enable development of applications for a device such as, for example, personal data assistant (PDA), a mobile phone, or a set top box (STB). As used herein, the term "device" is intended to encompass any compact computing device or emulated compact computing device. As a result of their compact size, such devices may function with limited resources. Due to such limited resources, the development of device applications may involve several differences from the development of traditional applications.

One such difference is related to debugging of test versions of applications. While traditional applications are typically both designed and debugged on a traditional computer, device applications are typically designed on a traditional computer and then deployed to a device for debugging. Device applications are typically designed on a traditional computer to take advantage of added resources available on the traditional computer. Device applications are typically debugged on a device so that they may be run and tested in a limited resource operating environment for which they are designed. Deploying a device application to a device involves several challenges which are not present when an application is deployed to a traditional computer.

One such challenge involves efficiently deploying an application and associated databases to a device. In one conventional development method, an associated database is created using a script when an application is first run. In another conventional development method, a database is manually created on a target device, then copied to a development computer for storage, and then manually copied back to the target device to be run and tested. Such conventional methods are limited in their effectiveness. Due to the limited resources available on a device, however, a database cannot be created and managed on a device as efficiently as on a development computer. Additionally, copying a database to and from a target device is often a time-consuming process. Thus, such conventional methods are cumbersome and make it difficult to maintain the database schema and content. The disadvantages of such conventional methods are compounded when development of a device application includes several debug builds, thereby requiring a database to be redeployed to a device multiple times. Thus, there is a need in the art for systems and methods for efficiently deploying a device database to a device.

Another challenge of deploying a device application to a device involves efficiently deploying stored procedures and triggers within a device database. Conventional development tools are limited with respect to associating stored procedures and triggers with a device database. In one conventional method, stored procedures and triggers may be associated with a device database using manual commands. Such manual association is also cumbersome and requires knowledge of the programmatic methods to associate the stored procedure and/or trigger with the database. Thus there is a need in the art for a mechanism for efficiently associating stored procedures and triggers with a device database in a development environment. It is desired that such systems and methods enable stored procedures and triggers to be automatically registered with a device database and efficiently deployed to a device in conjunction with the device database.

SUMMARY OF THE INVENTION

A development tool in accordance with the present invention may have a solution including both a device project and a data project. The device project may be associated with a particular device application. The device project may be a device debugging project, which is used to develop versions of the application, or a device setup project, which is used to distribute a finished version of the application. The device project may include a reference to a device database, which may be managed on a development computer using the development tool. The referenced device database may be created on the development computer using the development tool or it may be created on another device and copied to the development computer.

The referenced device database may have an installation property which provides logic guiding how the device database is to be installed at a device. The settings for the installation property may include, for example, an always overwrite setting, an overwrite if different, and a never overwrite setting. Such settings may determine whether the device database will overwrite an existing device database of the same name on the target device. The device database may be deployed to the target device as part of the device project and installed on the target device according to the installation property.

In addition to the device project, the solution may also include a data project. The data project may have stored procedures and/or triggers. The data project may also have a target database property, which enables the data project to be associated with a device database that is referenced within a device project. When the solution is built, the stored procedures and triggers within the data project may be automatically compiled, embedded in the associated device database, and registered with the associated device database. The stored procedures and triggers may then be deployed to the device as part of the associated device database.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 15 shows a flowchart of an exemplary build process in accordance with the present invention.

DETAILED DESCRIPTION OF ILLUSTRATIVE EMBODIMENTS

We will now explain the present invention with reference to presently preferred, exemplary embodiments. We will first describe an illustrative computing and development environments in which the invention may be practiced, and then we will describe presently preferred implementations of the invention.

Illustrative Computer Environment

Figure 1:
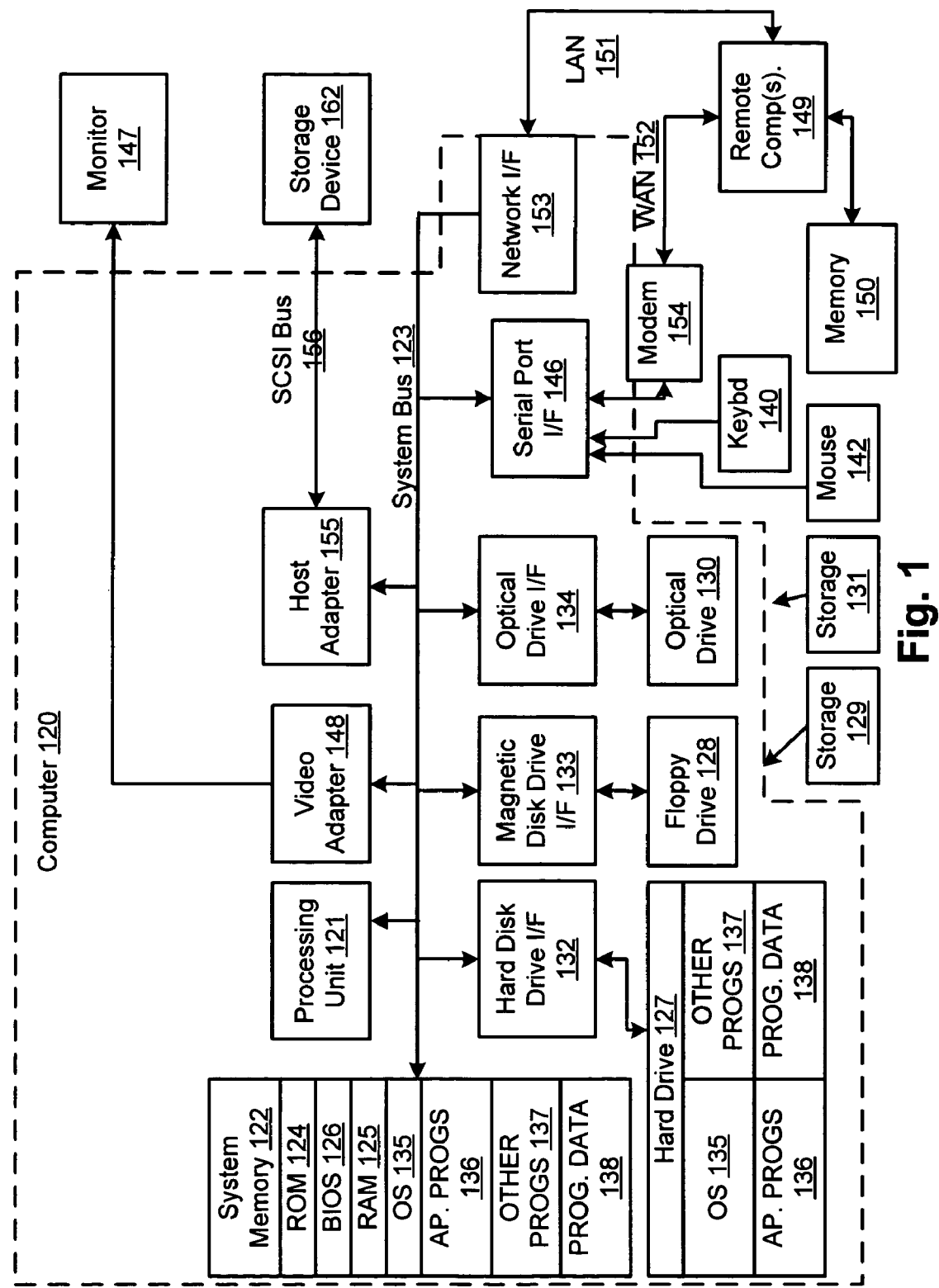
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or an application service. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during startup, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application 212 programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156 The personal computer 120 may operate in a networked environment using logical connections to one or more remote computers, such as a remote computer 149. The remote computer 149 may be another personal computer, a application service, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Development Environment

Figure 2:
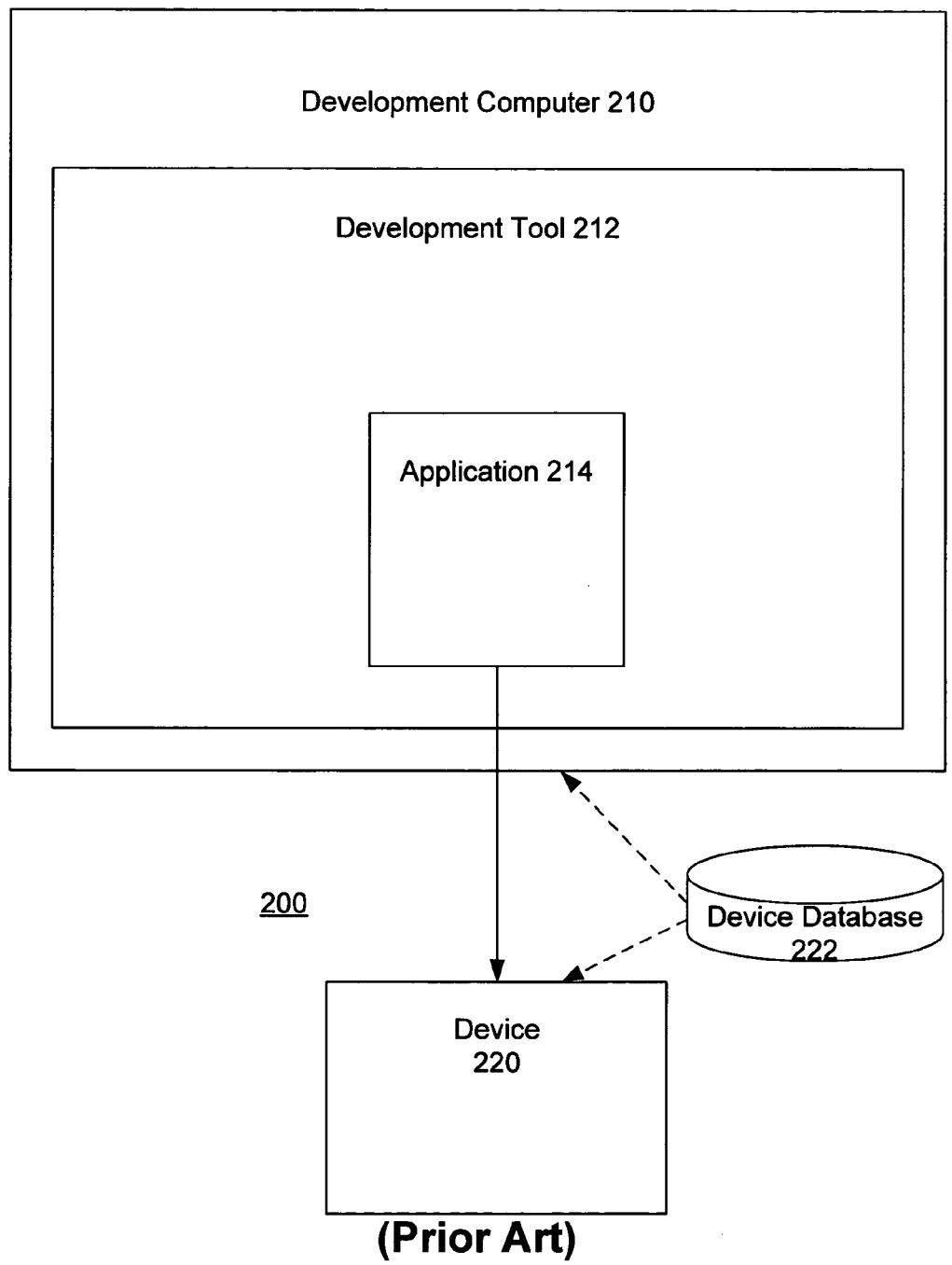
FIG. 2 is a block diagram of an exemplary prior art development environment.

An exemplary prior art development environment 200 is shown in FIG. 2. Development environment 200 includes development computer 210 and device 220. Development computer 210 may be a traditional computer such as, for example, a desktop computer or a laptop computer. Device 220 may be a device such as, for example, personal data assistant (PDA), a mobile phone, or a set top box (STB). Device 220 may be a compact device and may function with limited resources due to its compact size.

Development tool 212 runs on development computer 210. Development tool 212 may be a product such as, for example, VISUAL STUDIO™ from Microsoft Corp. of Redmond, Wash. Development tool 212 is described in detail below with reference to FIG. 3. Generally, development tool 212 enables the development of application 214 for device 220. Application 214 may be, for example, a web application, an extensible markup language (XML) web service, or a traditional client application. Development tool 212 enables test versions of application 214 to be designed and managed on development computer 210. Additionally, development tool 212 enables test versions of application 214 to be deployed to device 220 for debugging. Furthermore, development tool 212 also enables a finished version of application 214 to be distributed to device 220.

Application 214 is a data-driven application with an associated device database 222. Device database may be a compact database that is suitable for finctioning on device 220. Device database 222 may be used to categorize, organize, and maintain data structures which are useful to application 214.

Device database 222 may be deployed to device 222 along with application 214 for debugging and distribution of application 214. Device database 222 may be created using script when application 214 is first run. Alternatively, device database 222 may be created on device 220 using, for example, a query builder. Device database 222 may then be copied to development computer 210 for storage and manually copied back to device 222 for debugging and distribution.

Figure 3:
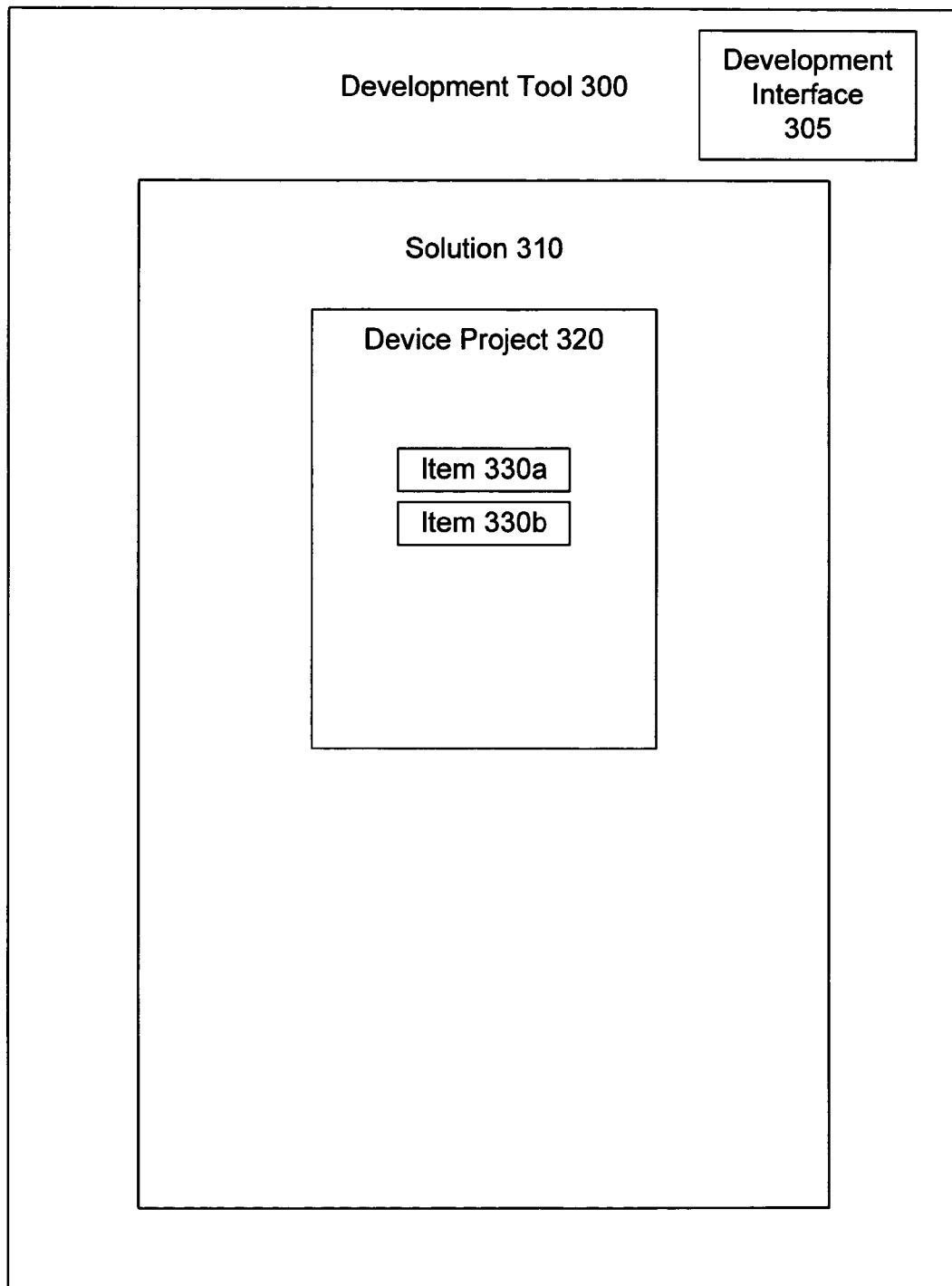
FIG. 3 is a block diagram of an exemplary prior art development tool.

An exemplary prior art development tool 212 is shown in FIG. 3. Development tool 212 includes solution 310 (and possibly other solutions), which, in turn, includes device project 320 (and possibly other device projects), which, in turn, includes items 330*a* and 330*b*. The terms project and solution, as used herein, refer to any type of containers that include items 330*a* and 330*b*.

Items 330*a* and 330*b* may be items that are useful with respect to developing application 214 such as, for example, references, data connections, folders, and files. Items 330*a* and 330*b* are project items which are associated with project 320. Solution 310 may also include solution items (not shown) which are associated with the entire solution 310 and are not specific to project 320 or any other project. Furthermore, development tool 212 may include miscellaneous items (not shown) which are not associated with solution 310 or any other solution.

Device project 320 enables its contents, items 330*a* and 330*b*, to be configured, built, and deployed to device 220 as a single unit. Solution 310 enables its contents, device project 320 and possibly other device projects and solution items, to be configured, built, and deployed to device 220 as a single unit. Each time a new project is created, development tool 212 may generate a new solution in which to include the new project. A new project may be added to a new solution, or, alternatively, to a previously existing solution. Device project 320 may differ from a development project for a traditional computer in that device project 320 may include specific programming finctionality that is unique to certain types of devices.

Development tool 212 includes a development interface 305 for viewing and managing solution 310, device project 320, and items 330a-330d. Interface 305 may be, for example, SOLUTION EXPLORER™ from Microsoft Corp. of Redmond, Wash.

Application 214 may be associated with solution 310 and its contents. Device project 320 may be used with respect to specific stages of the development of application 214. For example, device project 320 may be a main device project, which enables test versions of application 214 to be designed and deployed to device 220 for debugging. Additionally, device project 320 may be a device setup project, which enables a finished version of application 214 to be deployed to device 220. Device project 320 and its contents may be deployed to device 220 as, for example, an executable program (.exe) file or a dynamic link library (.dll) file.

Figure 4:
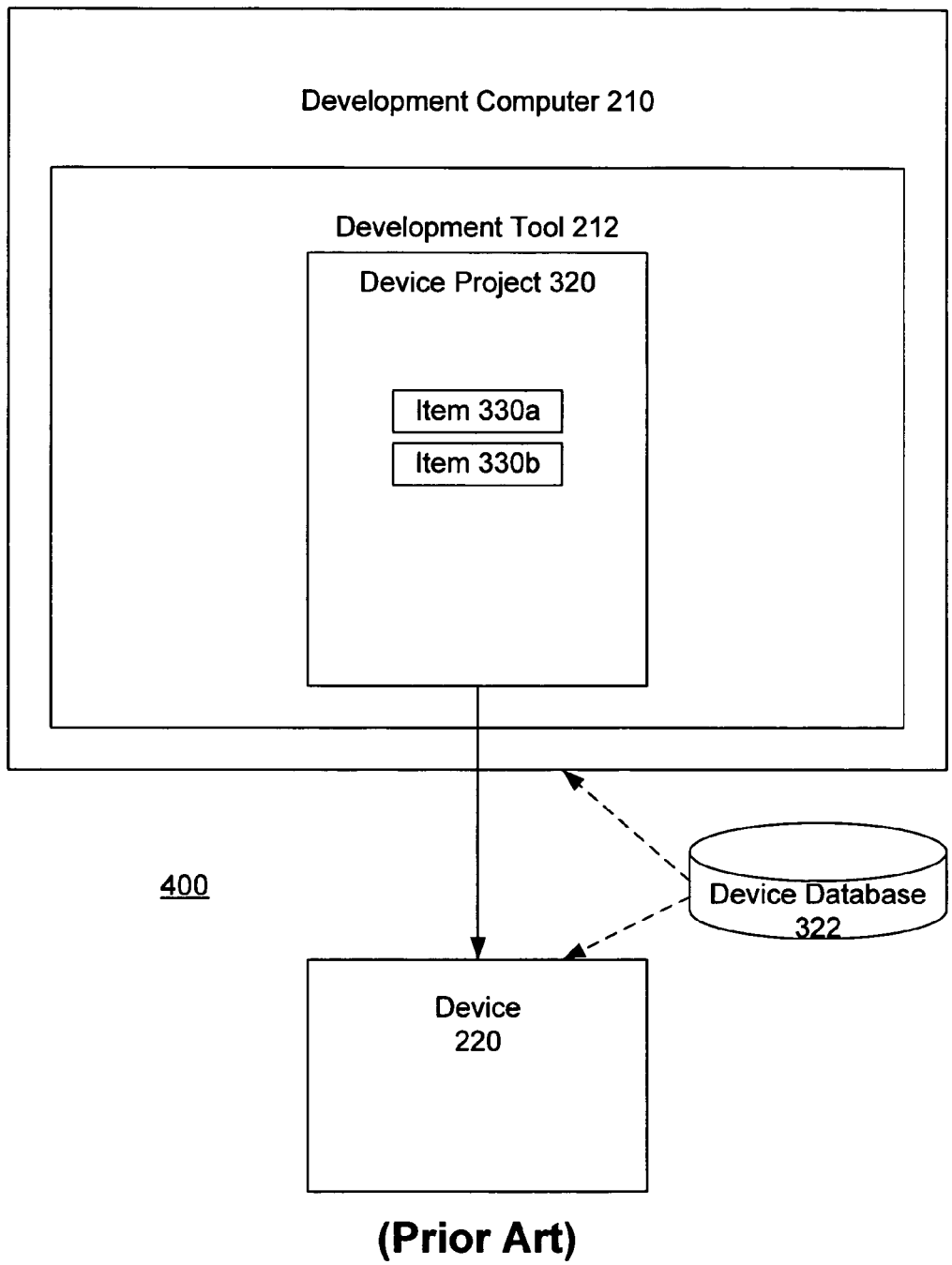
FIG. 4 is a block diagram of an exemplary prior art deployment environment.

An exemplary prior art deployment environment 400 is shown in FIG. 4. Generally, device project 320 is deployed from computer 210 to device 220 for debugging or distribution of application 214. Additionally, device database 322 may be created using script or manually copied to device 220. As discussed previously, such methods for deploying device database 322 are slow and cumbersome and make it difficult to maintain the schema and structure of device database 322.

Device Database Deployment

A development tool in accordance with the present invention enables a device database to be created and managed on a development computer and included as part of a device project. The device database may be deployed to a device in conjunction with other contents of the device project. The device database may have an associated installation property which provides logic for installing the device database at the device.

Figure 5:
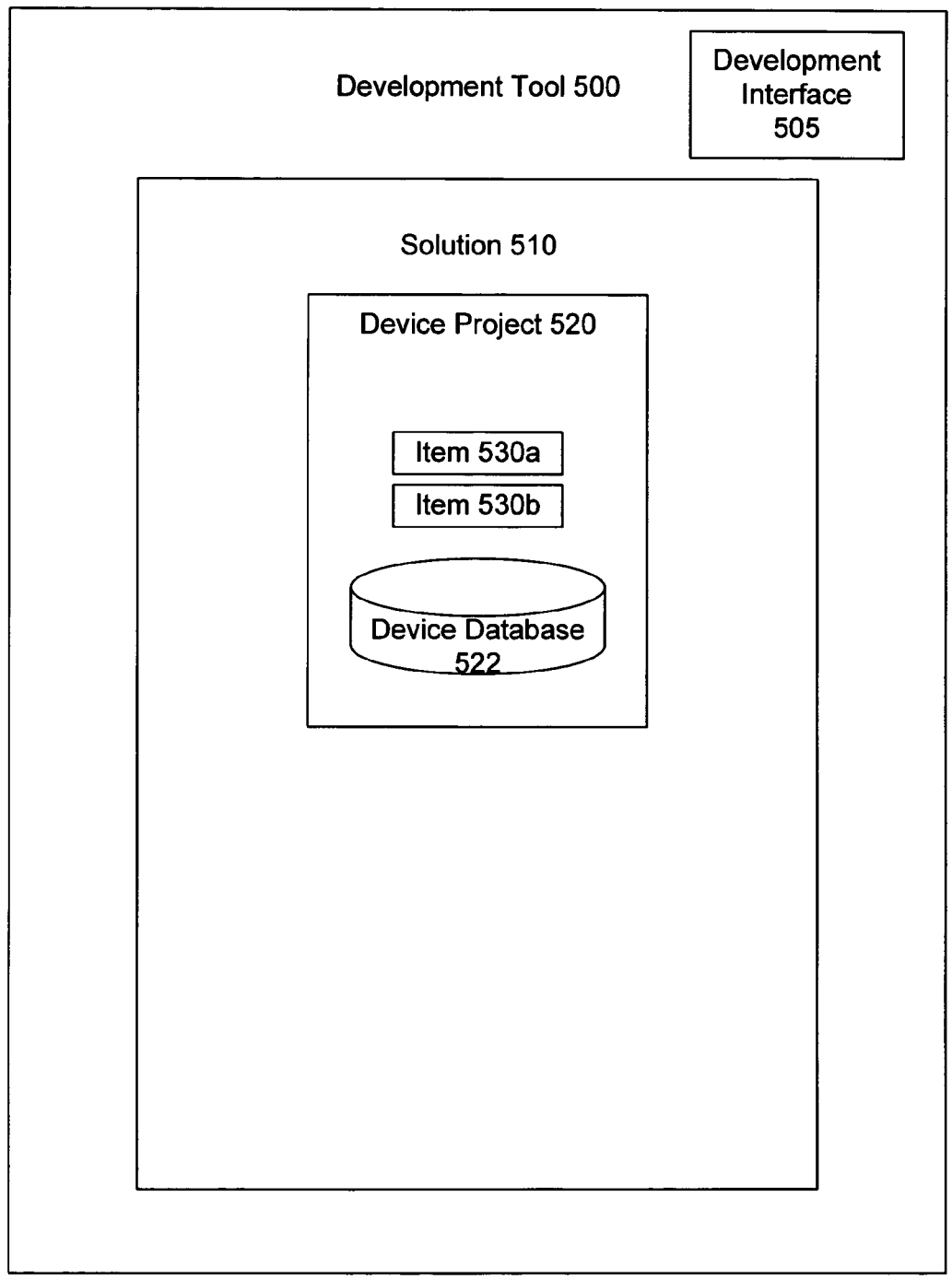
FIG. 5 is a block diagram of an exemplary development tool with a device database in accordance with the present invention.

An exemplary development tool 510 with a device database 522 in accordance with the present invention is shown in FIG. 5. Unlike prior art development tool 210 of FIG. 3, development tool 510 enables a device database 522 to be included in device project 520. The inclusion of device database 522 in device project 520 enables device database 522 and items 530a and 530b to be configured, built, and deployed as a single unit. Device database 522 may be included in device project 520 by providing a reference to the source location of device database 522. Even if the source location of device database 522 is not on a development computer, device database 522 may nevertheless be referenced in the project and configured, built, and deployed as part of the project. Device database 522 may also be copied from its source location to a development computer.

Device project 520 may be, for example, a main device project or a device setup project. If device database 520 is first created in a main device project and a device setup project is later added to solution 510, then device database 522 may be automatically included in the device setup project. The settings and the install logic for device database 522 may be automatically carried over from the main device project to the device setup project, thereby making it seamless to design, debug, and distribute device database 522.

If a device setup project already exists in solution 510 when device database 522 is added to a main device project, then the settings and install logic for the device database 522 in the main device project may automatically update the device setup project. If device database 522 is deleted from a main device project, then device database 522 may also be automatically deleted from a device setup project.

Figure 6:
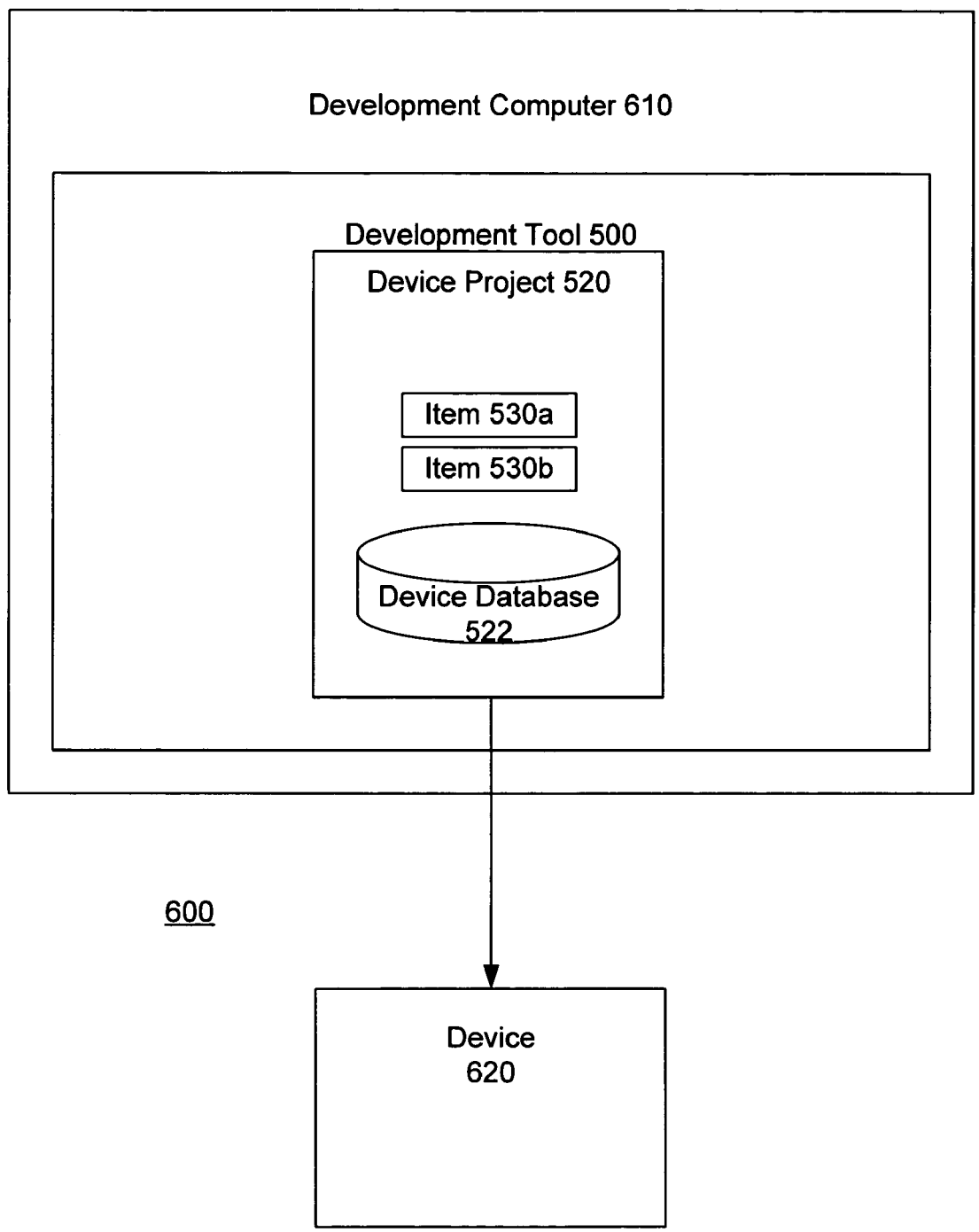
FIG. 6 is a block diagram of an exemplary device database deployment environment in accordance with the present invention.

An exemplary device database deployment environment 600 in accordance with the present invention is shown in FIG. 6. Generally, in deployment environment 600, unlike in prior art deployment environment 400 of FIG. 4, device database 522 is deployed to device 620 as part of device project 520 rather than being separately copied to device 620.

Upon its deployment, device database 522 may be installed at device 620 according to an associated installation property. The installation property may enable a user to determine under which circumstances an existing version of device database 522 on device 620 is to be overwritten by a re-deployed version of device database 522. Such an installation property is particularly useful when device project 520 is re-deployed to device 620 multiple times during application development with no or few significant changes to device database 522. In such a scenario, because overwriting may often be a time-consuming process, it may not be desirable to overwrite an existing version of device database 522 on device 620.

The installation property may include, for example, an always overwrite setting, an overwrite if different setting, and a never overwrite setting. The always overwrite setting indicates that the deployed version of device database 522 will overwrite an existing version of device database 522. The overwrite if different setting indicates that the deployed version of device database 522 will overwrite a version of device database 522 if the deployed version of device database 522 is different from the existing version of device database 522. The never overwrite setting indicates that device database 522 will never overwrite an existing version of device database 522.

Figure 7:
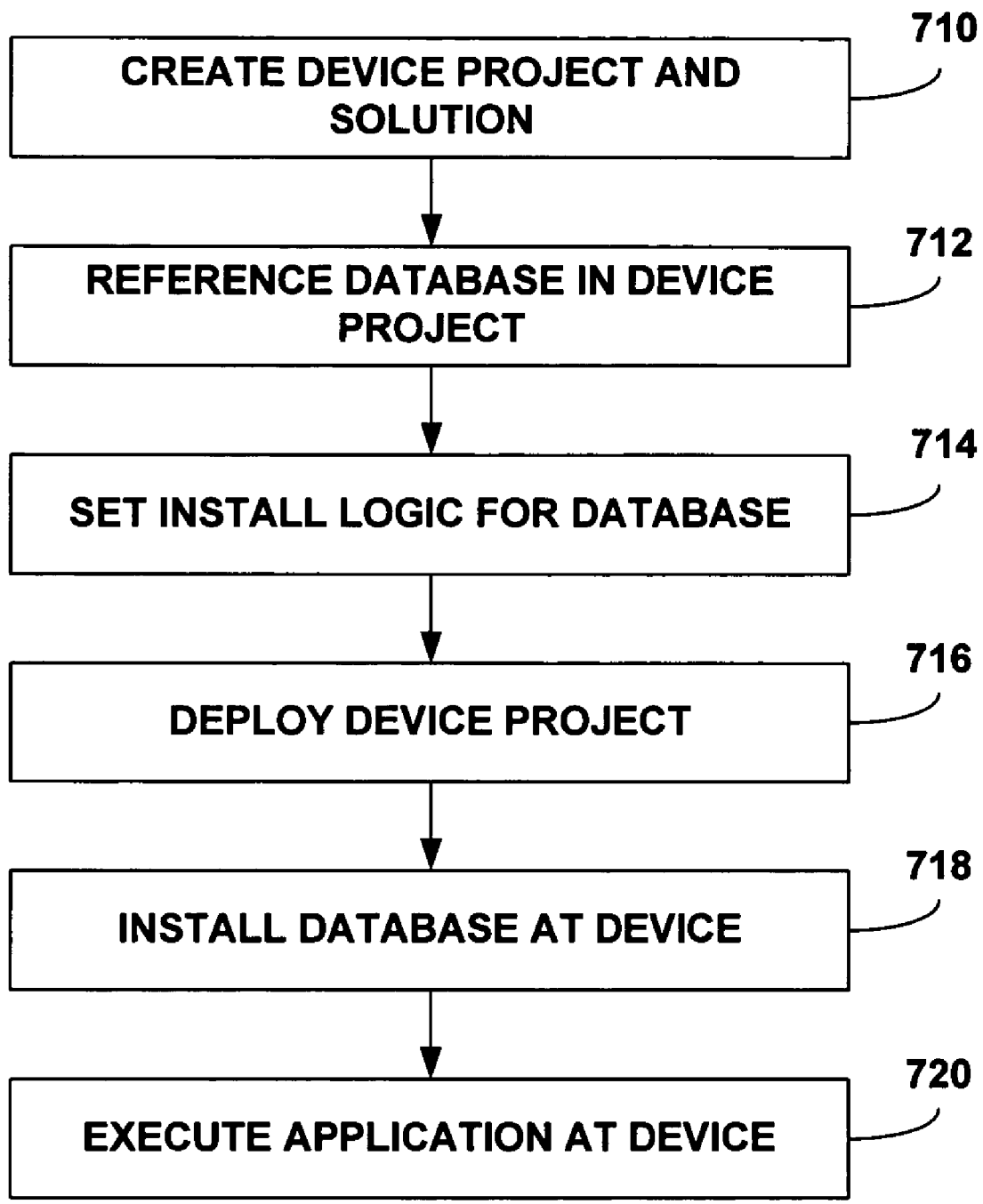
FIG. 7 is a flowchart of an exemplary method for deploying a device database in accordance with the present invention.

A flowchart of an exemplary method for deploying a device database in accordance with the present invention is shown in FIG. 7. At step 710, device project 520 is created. Device project 520 may be created as part of a new solution or may be added to a previously existing solution. As set forth above, a main device project may be created for deploying and debugging test versions of application 214. A device setup project may be selected for distributing finished versions of application 214.

Figure 8:
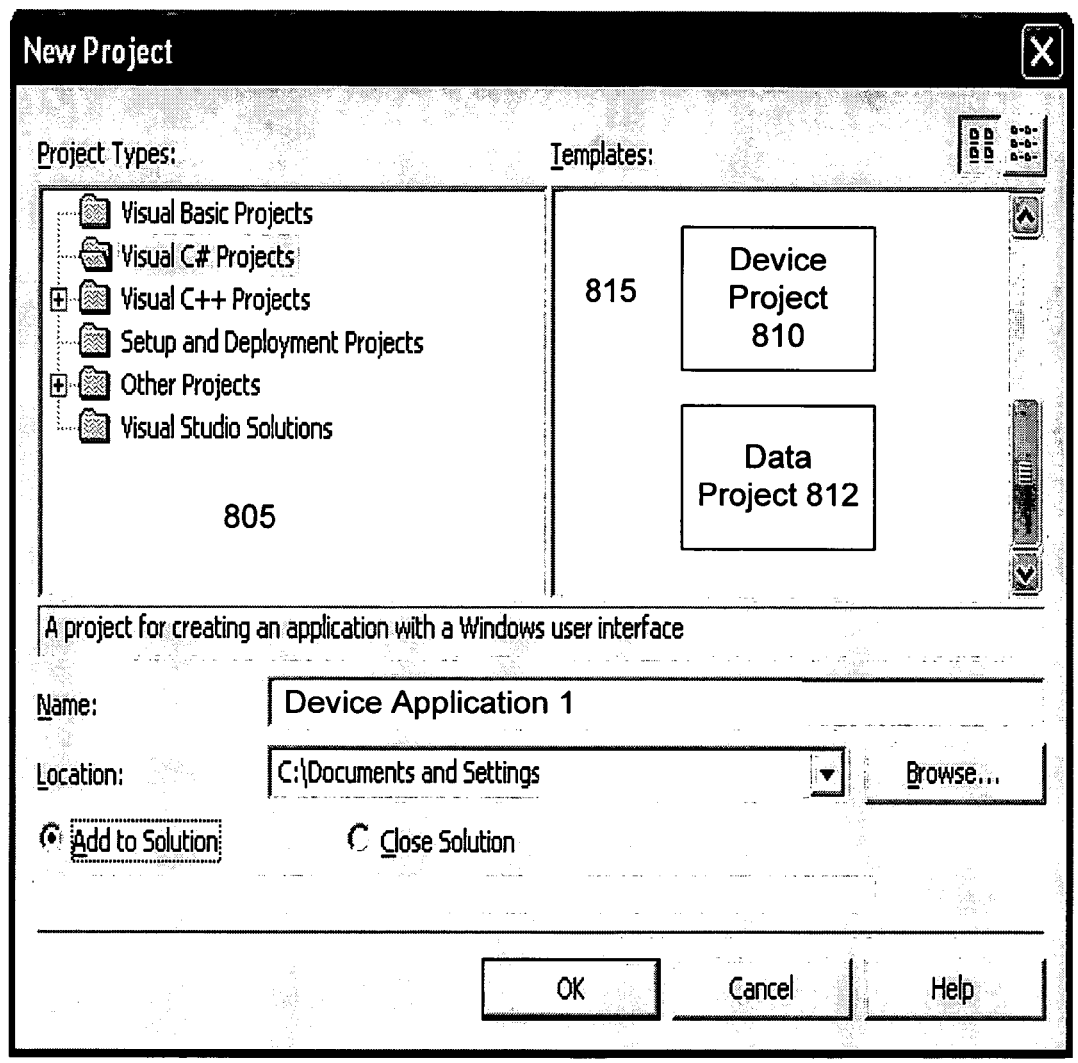
FIG. 8 shows an exemplary interface for creating a device project in accordance with the present invention.

An exemplary interface 800 for creating device project 520 is shown in FIG. 8. Interface 800 may be displayed by development interface 505. Display 800 includes a project type window 805, which displays available project types, and a template window 815, which displays available project templates within a selected project type. The device project template is an available project template within the C# project type and possibly other project types. A user may create device project 520 by, for example, clicking device project icon 810 with an attached mouse.

At step 712, device database 522 is referenced in device project 520. Device database 522 may be referenced in device project 520 by providing a reference to the source location of device database 522. Interface 505 may be configured to notify a user if the referenced device database 522 is not present on development computer 610. Interface 505 may generate a pop-up display asking the user if device database 522 should be copied from another device onto development computer 610. Device database 522 may be cut or copied and pasted into project 520 from another existing project on development computer 610.

Figure 9:
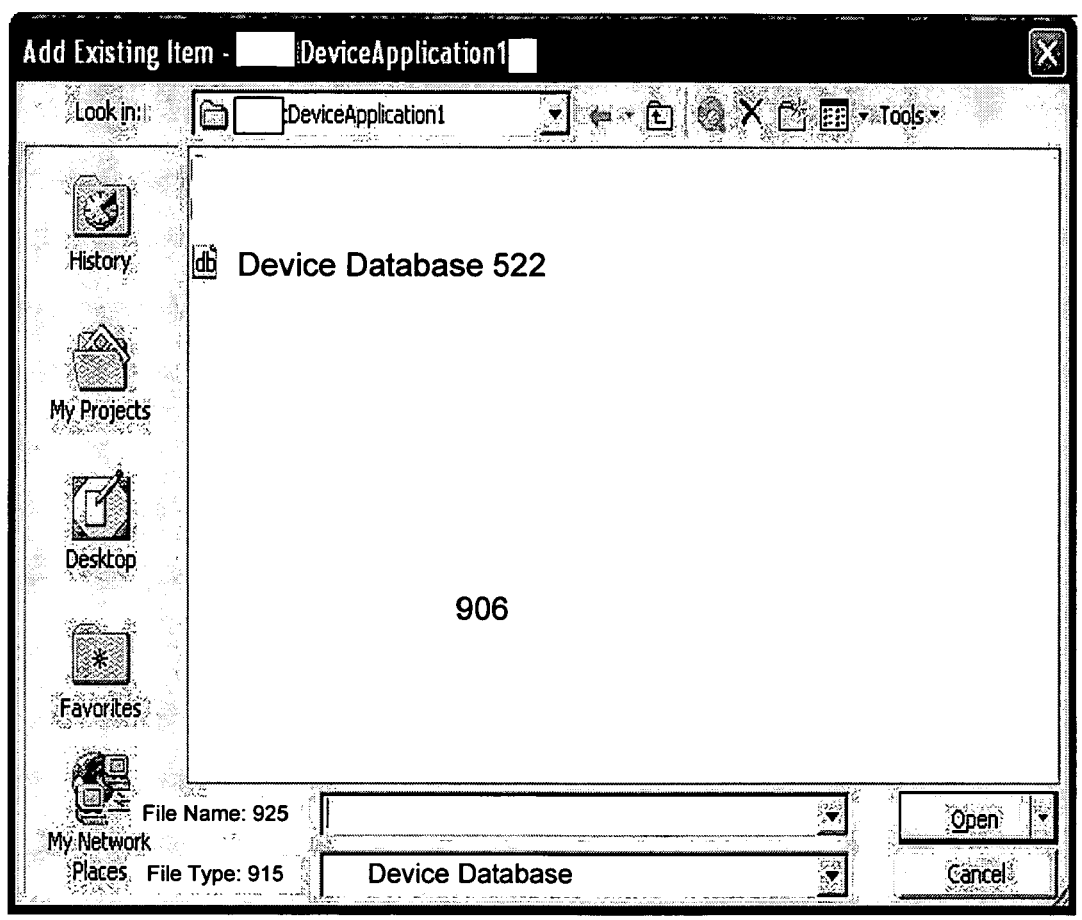
FIG. 9 shows an exemplary interface for referencing a device database in a device project in accordance with the present invention.

An exemplary interface 900 for adding device database 522 to device project 520 is shown in FIG. 9. Interface 900 includes a content window 905 which shows the contents of device project 520. A user may add device database 522 to device project 520 by, for example, selecting a device database option from file type drop down menu 915. The user may also create a name for device database 522 by typing the file name in file drop down menu 925. Alternatively, the user may right click in content window 905 with an attached mouse and select a device database file type.

At step 714, install logic for device database 522 is set. The install logic may be set, for example, by right clicking on the icon for device database 522 in content window 906 of FIG. 9 and selecting a select install property option. The available installation settings may then be displayed. As set forth above, the installation property may include, for example, an always overwrite setting, overwrite if newer setting, and a never overwrite setting.

At step 716, device project 520 is deployed to device 620, and, at step 718, device database 522 is installed on device 620 according to the installation property set at step 714. If a user has selected the always overwrite setting, and an existing version of device database 522 that resides on device 629 is a read-only database, then an error message may be displayed. The error message may alert the user that the existing version of device database 522 is read-only and may query if the existing device database should be overwritten.

At step 720, application 214 may be executed at device 620. If a test version of application 214 is deployed at step 716, then the test version may be debugged on device 620. If a finished version of application 214 is deployed at step 716, then the finished version may be executed on device 620 in connection with device database 522.

Registering and Deploying Stored Procedures and Triggers with a Device Database

In addition to enabling a device database to be created, managed, and deployed as part of a device project, a development tool in accordance with the present invention enables stored procedures and triggers to be associated and registered with a device database. Such associated stored procedures and triggers may be deployed with the device database to a device as part of an overall solution. The development tool may also provide a template for writing a new stored procedure or trigger.

Figure 10:
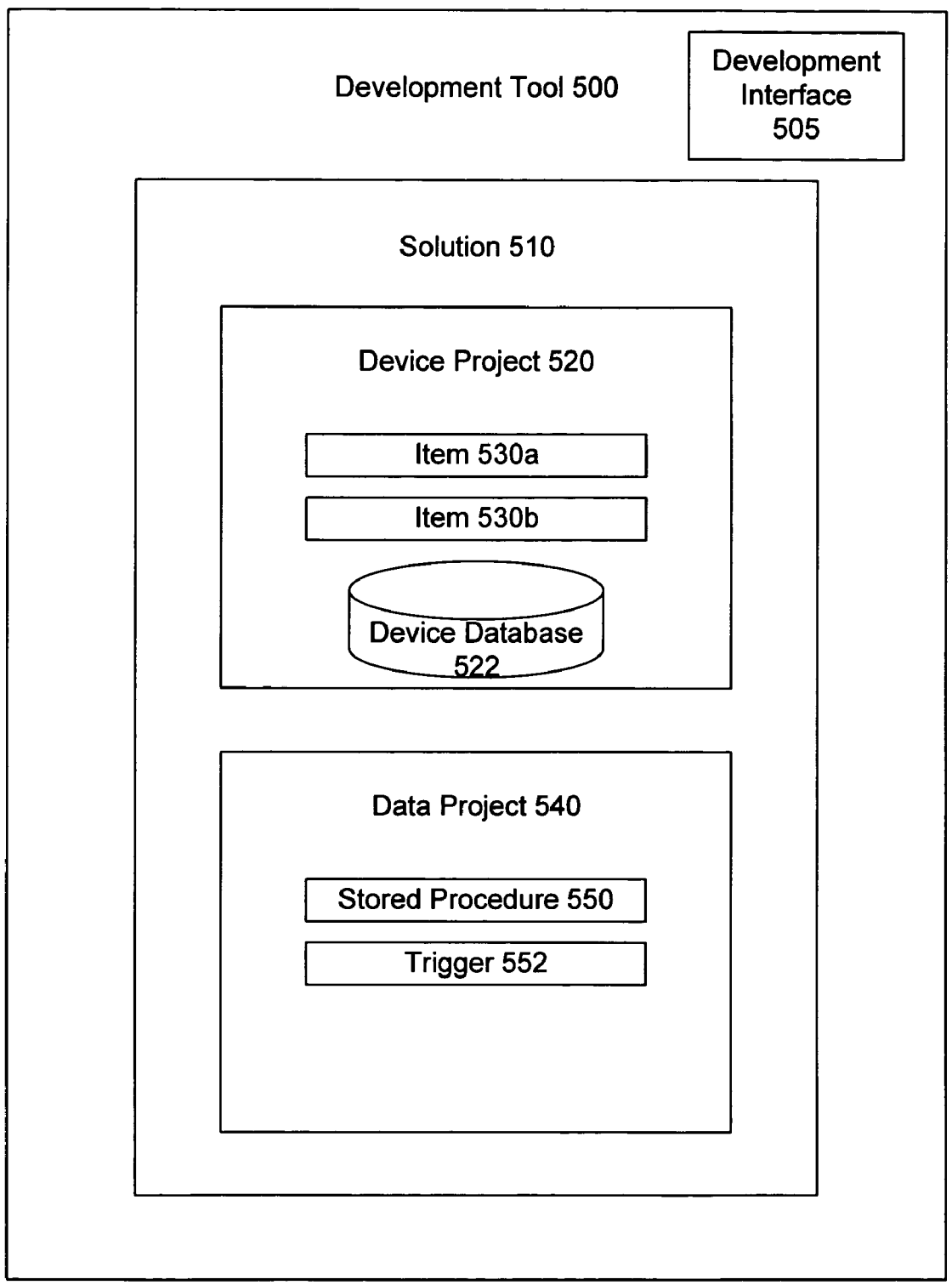
FIG. 10 is a block diagram of an exemplary development tool with a device database and a stored procedure and trigger in accordance with the present invention.

Referring now to FIG. 10, solution 510 includes data project 540 in addition to device project 520. Data project 540 includes stored procedure 550, trigger 552, and possibly other stored procedures and triggers. Data project 540 may have a target database property that enables data project 540 and its contents to be associated with a selected target database. Each referenced database 522 within solution 510 may be available as a target database for data project 540.

Development interface 505 may provide a view of all stored procedures and triggers that are associated with device database 522. Such a view may be used to add or delete stored procedures and triggers that are associated with device database 522. Development interface 505 may also provide a view of the properties all stored procedures 550 and triggers 552 that are associated with device database 522. Such a view may be used to edit the properties of the associated stored procedures and triggers.

Figure 11:
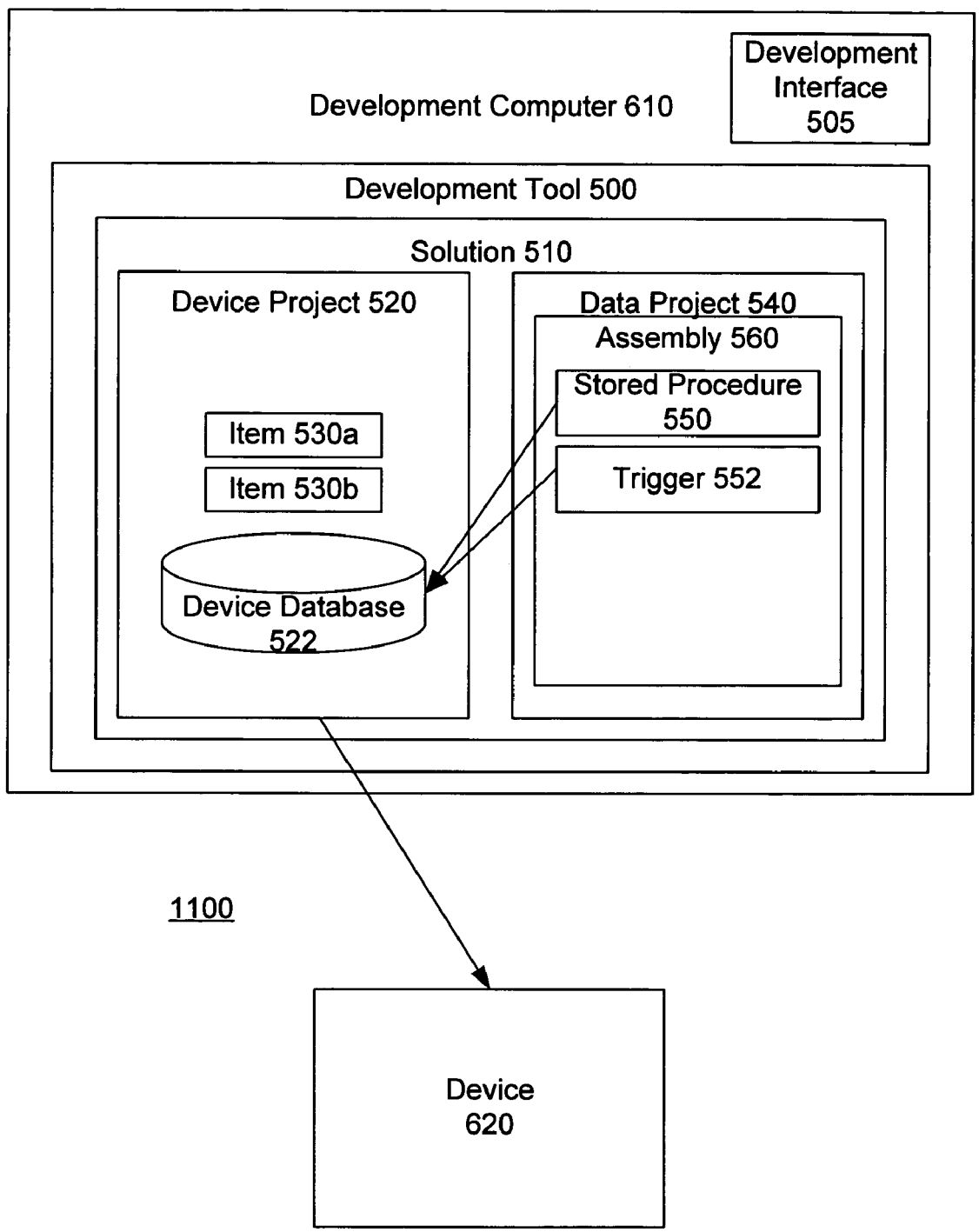
FIG. 11 is a block diagram of an exemplary deployment environment for a device database and an associated stored procedure and trigger in accordance with the present invention.

If data project 540 is associated with device database 522, then its contents may be deployed to device 620 as shown in FIG. 11. Generally, when solution 510 is built, stored procedure 550 and trigger 552 may be automatically compiled, embedded, and registered in device database 522. Stored procedure 550 and trigger 552 may then be deployed to device 620 in conjunction with device database 522. Alternatively, data project 540 and its contents may also be deployed to device 620 independently from device database 522.

Figure 12:
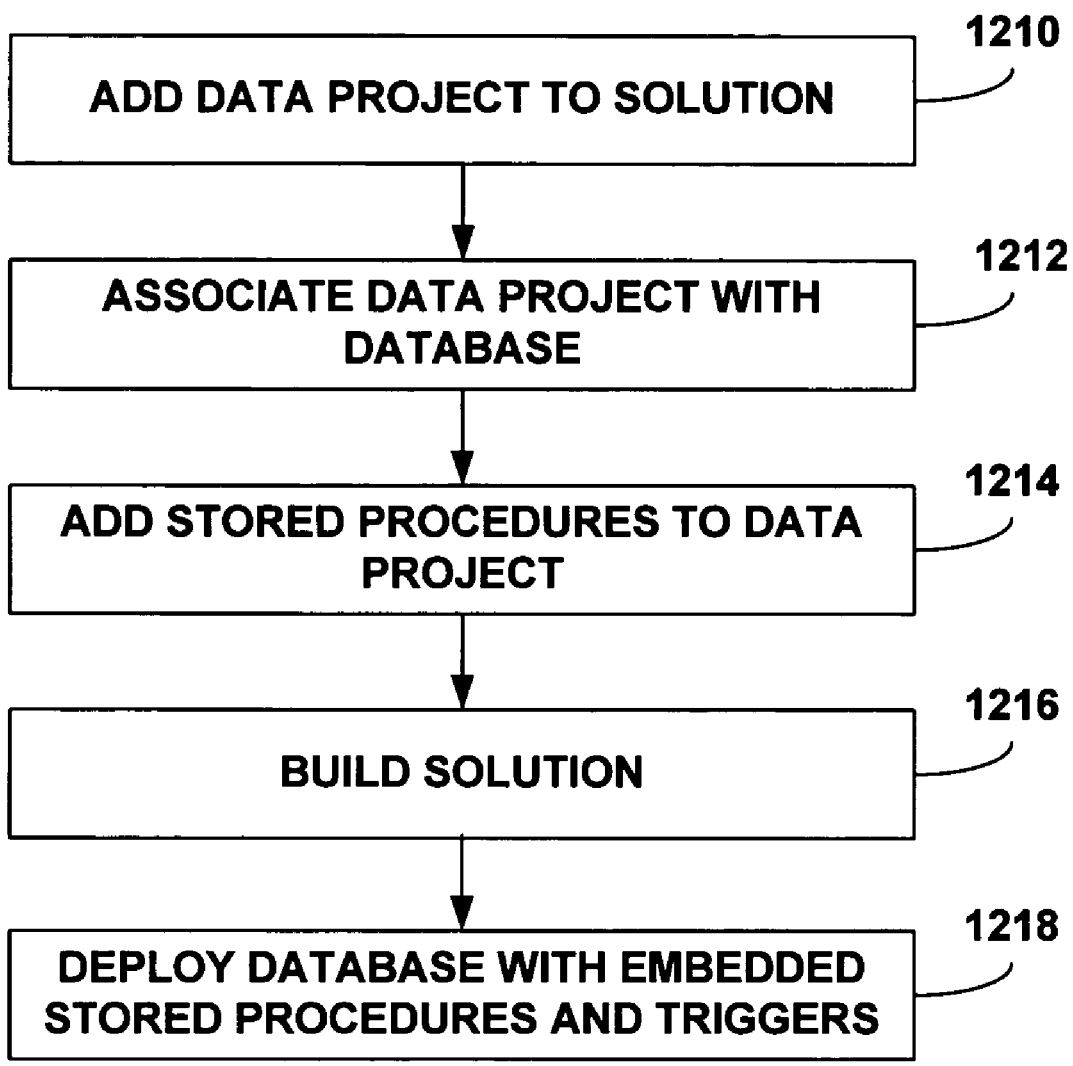
FIG. 12 is a flowchart of an exemplary method for registering and deploying stored procedures and triggers with a device database in accordance with the present invention.

A flowchart of an exemplary method for registering and deploying stored procedure 550 and trigger 552 in accordance with the present invention is shown in FIG. 12. At step 1210, data project 540 is added to solution 510. A user may, for example, add data project 540 to solution 510 using display 800 of FIG. 8 by clicking data project icon 812 with an attached mouse. Data project 540 may include default contents such as, for example, skeleton code for an empty stored procedure.

At step 1212, data project 540 is associated with device database 522. A user may associate data project 540 with device database 522 by selecting device database 522 as the target database for data project 540.

Figure 13:
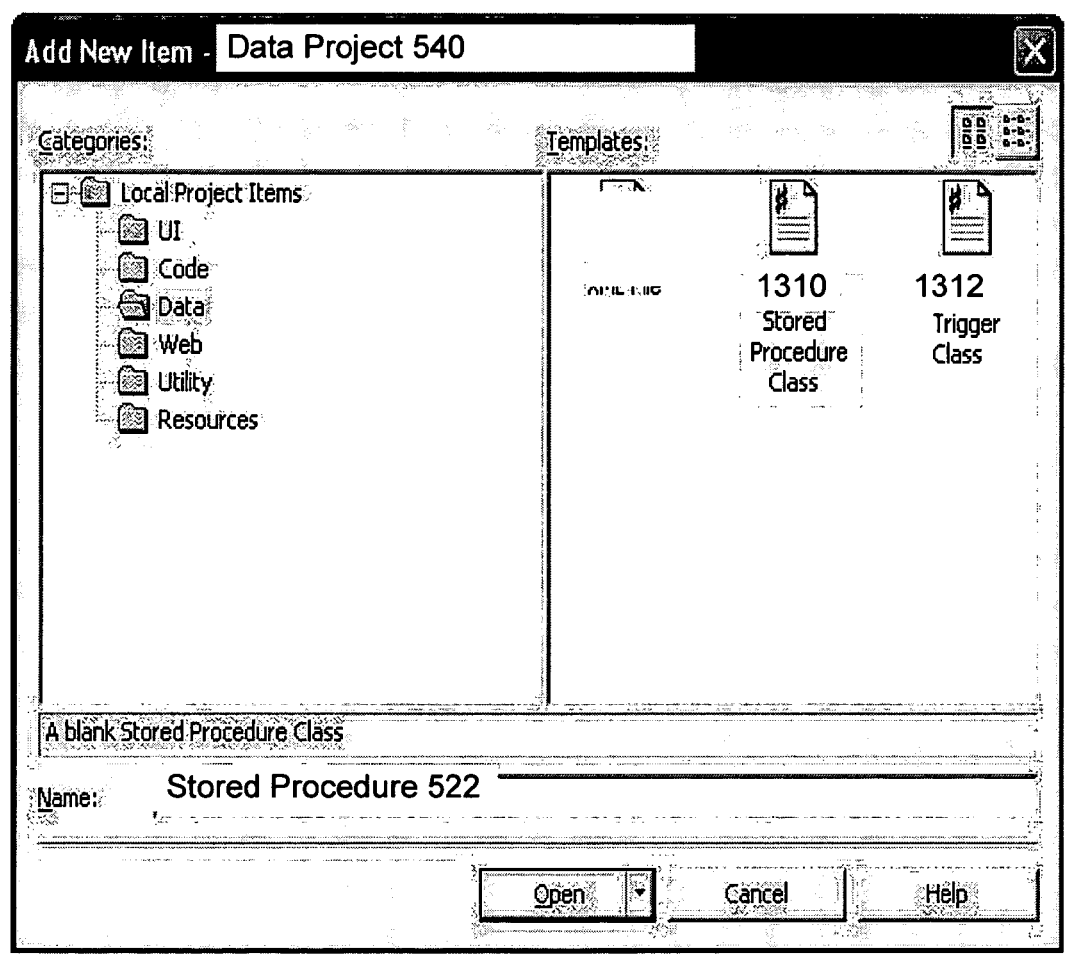
FIG. 13 shows an exemplary interface for adding stored procedures and triggers to a data project in accordance with the present invention.

At step 1214, stored procedure 550 and trigger 552 are added to data project 540. Upon being added to data project 540, storage space for stored procedure 550 and trigger 552 may be reserved on device database 522. An exemplary interface 1300 for adding stored procedure 550 and trigger 552 to data project 540 is shown in FIG. 13. Interface 1300 includes a categories window 1305, which displays available categories of items, and a template window, which displays available item templates for a selected item category. A Stored procedure class template and a trigger class template are available templates within a data item category. A user may add stored procedure 550 and trigger 552 by, for example, clicking stored procedure class icon 1310 and trigger class icon 1312, respectively, with an attached mouse. Upon clicking icon 1310 or 1312, the user may be provided with a template with which to create stored procedure 550 or template 552.

At step 1216, a build process for solution 510 is executed. The build process is described in detail below with reference to FIG. 15. Generally, class files for stored procedure 550 and trigger 552 are compiled, embedded into device database 522, and registered with device database 522.

Figure 14:
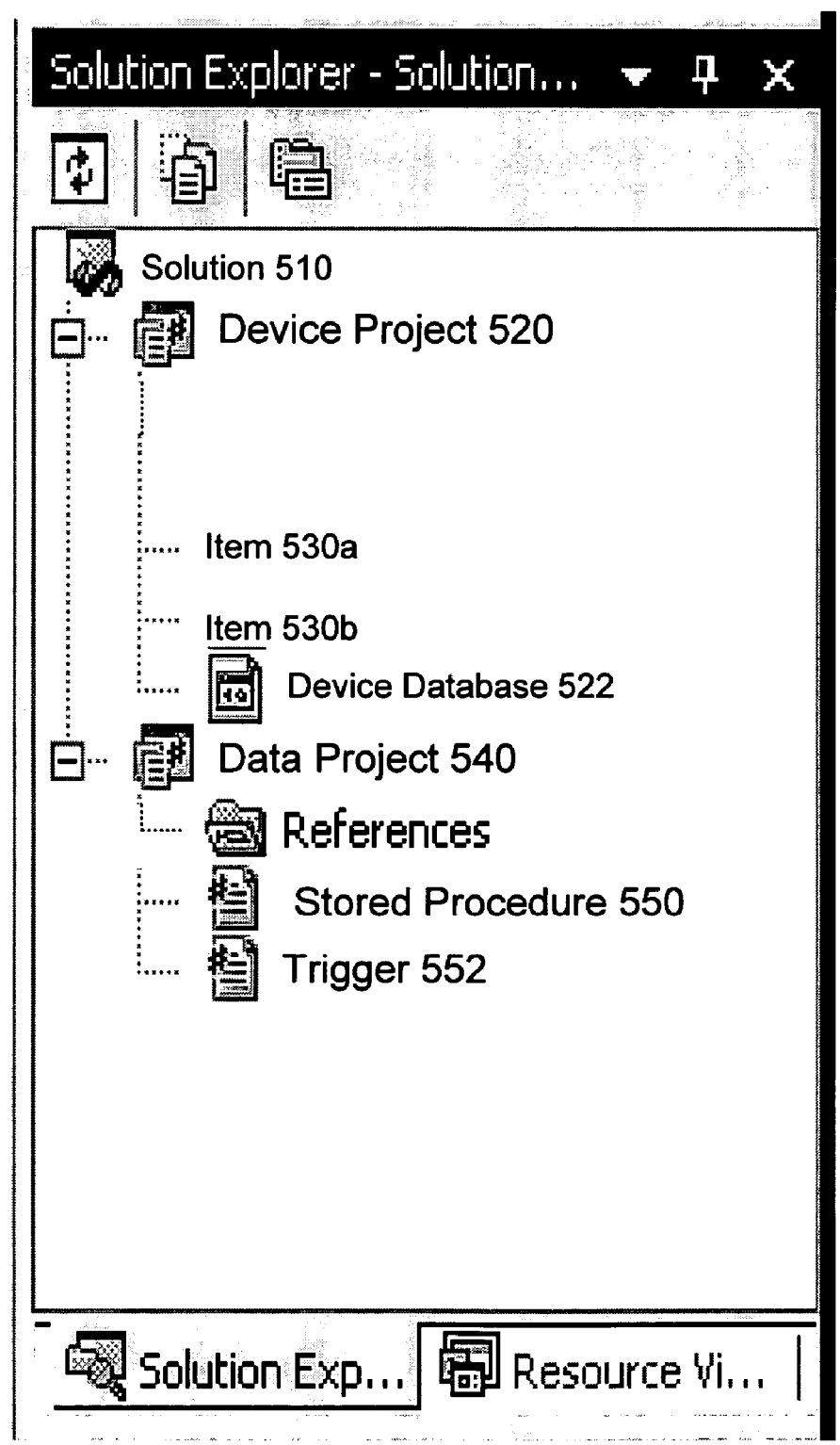
FIG. 14 shows an exemplary interface for displaying the contents of a solution in accordance with the present invention.

The build process may be executed in connection with a display of solution 510. An exemplary interface for displaying the contents of solution 510 is shown in FIG. 14. A user may, for example, right click on solution 510 and select a build solution option.

At step 1218, device database 522 is deployed to device 620 with embedded stored procedure 550 and trigger 552. As set forth above, device database 522 may be deployed as part of a main device project or a device setup project.

A flowchart of an exemplary build process 1500 for solution 510 is shown in FIG. 15. At step 1510, class files for stored procedure 550 and trigger 552 are compiled. The class files may, for example, be compiled into a single dynamic link library (.dll) file.

At step 1512, it is determined whether device database 522 exists and whether it has read/write access. If device database 522 does not exist or does not have read/write access, then, at step 1514, an error message may be displayed and build process 1500 may be cancelled.

At step 1516, it is determined whether assembly 560 is already present in device database 522. If assembly 560 is already present, then, at step 1518, the existing assembly and its associated files are unregistered and removed from device database 522.

At step 1520, a copy of assembly 560 is embedded into device database 522. It may be necessary to determine whether device database 522 is capable of supporting stored procedure 550 and trigger 552. If device database 522 does not support stored procedure 550 and trigger 552, then an error message may be displayed and the build process may be cancelled.

At step 1520, a copy of assembly 560 is embedded into device database 522. It may be necessary to determine whether device database 522 is capable of supporting stored procedure 550 and trigger 552. If device database 522 does not support stored procedure 550 and trigger 552, then an error message may be displayed and the build process may be cancelled.

At step 1522, assembly 560 is registered with device database 522. The term registration, as used herein, refers to the association of assembly 560 and/or its individual contents 550 and 552 with a device database. If device database 522 resides on device 620, then registration step 1522 is not performed until after deployment. Upon completion of registration, a message saying that registration has been completed may be displayed.

Conclusion

Thus, the present invention enables a device database to be created, managed, and deployed to a device as part of a device project. The present invention also enables stored procedures and triggers to be registered with a device database and deployed to a device in conjunction with the device database.

While the present invention has been described in connection with the preferred embodiments of the various figures, it is to be understood that other similar embodiments may be used or modifications and additions may be made to the described embodiment for performing the same function of the present invention without deviating therefrom. For example, a device database need not necessarily be deployed to a device in connection with an associated application. Therefore, the present invention should not be limited to any single embodiment, but rather should be construed in breadth and scope in accordance with the appended claims.

What is claimed:

1. A method for deploying a device database to a portable communication device, the method comprising:
providing an interface that enables a user to:
generate a solution corresponding to development of at least one software application;
generate a main device project within the solution for testing of the at least one software application;
store a device database in the main device project;
generate a device setup project within the solution for deployment of a finished version of the at least one software application to the portable communication device;
associate a data project with the main device project, the data project comprising a target database property that enables the data project and its contents to be associated with the device database; and
view stored procedures and triggers stored within the data project and currently associated with the device database and to add and delete stored procedures and triggers which are to be associated with the device database for the main device project and the device setup project;
automatically compiling the associated procedures and triggers, embedding them in the associated device database and registering them with the device database;
automatically copying the device database from the main device project to the device setup project without receiving an explicit instruction to do so;
deploying the device setup project to the portable communication device in a software development environment; and
installing the device database on the portable communication device according to an associated installation property for testing of the device on which the device database is being installed.

2. The method of claim 1, further comprising providing an interface that enables the user to debug a test version of the device database on the portable communication device.

3. The method of claim 1, wherein deploying the device setup project to the device comprises distributing a finished version of the device database to the portable communication device.

4. The method of claim 1, comprising providing an interface that enables the user to select an always overwrite installation property.

5. The method of claim 1, comprising providing an interface that enables the user to select an overwrite if different installation property.

6. The method of claim 1, comprising providing an interface that enables the user to select a never overwrite installation property.

7. A computer readable medium for deploying a device database to a portable communication device, the computer readable medium having stored thereon computer executable instructions that, when executed by a computer, cause the computer to perform a process comprising:
providing an interface that enables a user to:
generate a solution corresponding to development of at least one software application;
generate a main device project within the solution for testing of the at least one software application;
store a device database in the main device project;
generate a device setup project within the solution for deployment of a finished version of the at least one software application to the portable communication device;
associate a data project with the main device project, the data project comprising a target database property that enables the data project and its contents to be associated with the device database; and
view stored procedures and triggers stored within the data project and currently associated with the device database and to add and delete stored procedures and triggers which are to be associated with the device database for the main device project and the device setup project;
automatically compiling the associated procedures and triggers, embedding them in the associated device database and registering them with the device database;
automatically copying the device database from the main device project to the device setup project without receiving an explicit instruction to do so;
deploying the device setup project to the portable communication device in a software development environment; and
installing the device database on the portable communication device according to an associated installation property for testing of the device on which the device database is being installed.

8. The computer readable medium of claim 7, wherein the process further comprises providing an interface that enables the user to debug a test version of the device database an the portable communication device.

9. The computer readable medium of claim 7, wherein deploying the device setup project to the device comprises distributing a finished version of the device database to the portable communication device.

10. The computer readable medium of claim 7, wherein the process comprises providing an interface that enables the user to select an always overwrite installation property.

11. The computer readable medium of claim 7, wherein the process comprises providing an interface that enables the user to select an overwrite if different installation property.

12. The computer readable medium of claim 7, wherein the process comprises providing an interface that enables the user to select a never overwrite installation property.

* * * * *